United States Patent [19]

Inbar et al.

[11] 4,100,413
[45] Jul. 11, 1978

[54] RADIATION IMAGING APPARATUS WITH IMPROVED ACCURACY

[75] Inventors: Dan Inbar, Haifa; Yitzhak Klein, Kiryat Yam, Haifa, both of Israel

[73] Assignee: Elscint Ltd., Haifa, Israel

[21] Appl. No.: 723,305

[22] Filed: Sep. 14, 1976

[30] Foreign Application Priority Data

Sep. 17, 1975 [IL] Israel ........................................ 48113

[51] Int. Cl.² ............................................. G01T 1/20
[52] U.S. Cl. ................................. 250/366; 250/363 S
[58] Field of Search .................... 250/363 S, 366, 367, 250/369

[56] References Cited

U.S. PATENT DOCUMENTS 3,732,419   5/1973   Kulberg et al. .................. 250/363 S Primary Examiner—Davis L. Willis
Attorney, Agent, or Firm—Donald M. Sandler

[57] ABSTRACT

Radiation imaging apparatus includes a scintillation crystal responsive to radiation stimuli for producing light events, and a plurality of photodetectors arranged in a predetermined array relative to the crystal, each of the photodetectors having a light-sensitive surface facing the crystal and being responsive to a light event for producing an output signal. Coupling means associated with each photodetector applies its output signal to coordinate computing circuitry which computes the coordinates of a light event from signals applied thereto.

In one embodiment of the invention, at least one of the coupling means includes a threshold linear gate for applying the output of the photodetector with which the coupling means is associated, to the coordinate computation circuitry only if the input to this particular photodetector exceeds a predetermined threshold. In another embodiment of the invention, the coupling means specifies the region in the crystal within which a light event occurs, and couples to the coordinate computing circuitry only those photodetectors immediately adjacent the light event.

9 Claims, 4 Drawing Figures

RADIATION IMAGING APPARATUS WITH IMPROVED ACCURACY

BACKGROUND OF THE INVENTION

This invention relates to radiation imaging apparatus of the type employing an Anger-type scintillation camera, and coordinate computation circuitry for computing the coordinate of a light event from the camera signals.

An Anger-type scintillation camera, as disclosed in U.S. Pat. No. 3,011,057, includes a scintillation crystal responsive to radiation stimuli for producing light events, and a plurality of photomultipliers arranged in a predetermined array relative to the crystal, each of the photomultipliers having a photosensitive surface facing the crystal and being responsive to a light event for producing an output signal. The photomultipliers have overlapping fields of view and the position of a light event is ascertained by weighting each photomultiplier output in accordance with the distance of the photomultiplier from a reference axis, and combining the weighted outputs in a predetermined manner.

The accuracy with which the coordinates of a light event are computed depends on the coordinate computation circuitry which determines the weight applied to the photomultiplier signals and the manner in which they are combined. The resolution achieved with the coordinate computation circuitry disclosed in U.S. Pat. No. 3,011,057 is relatively poor because such circuitry does not take into account statistical variations in the number of photons produced by a light event, their distribution relative to the photocathodes of the photomultiplier tubes, and the efficiency of photomultipliers in converting photons to electrical signals.

U.S. Pat. No. 3,732,419 discloses that the accuracy of measurements can be improved by eliminating contributions from photomultipliers remote from a light event, or by enhancing contribution from photomultipliers near an event. The last-mentioned patent discloses a coordinate computation circuit that includes a circuit with a non-linear characteristic having the property of enhancing large signals more than small signals. Computational results are improved since the non-linear characteristic of the circuit essentially eliminates signal information with a relatively high probability of significant error which previously had exerted a strong effect on computational results.

The primary disadvantage of the coordinate computation circuitry disclosed in U.S. Pat. No. 3,732,419 is the reduction introduced by the non-linear characteristic circuit in output signal strength for the photomultipliers close to a light event in order to reduce the level of output signals for photomultipliers remote from a light event. Thus, position information useful in increasing the accuracy of the computations is reduced.

It is an object of the present invention to provide a new and improved radiation imaging apparatus which overcomes, or substantially reduces, the disadvantage of the prior art.

SUMMARY OF THE INVENTION

The present invention provides radiation imaging apparatus of the type having a scintillation crystal responsive to radiation stimuli for producing light events, a plurality of photodetectors arranged in a predetermined array relative to the crystal for producing output signals in response to a light event, and coordinate computation circuitry for computing the coordinates of a light event from signals applied thereto. The output signal of each photodetector is applied to the coordinate computation circuitry via coupling means that includes a delay circuit for delaying the output signal of the photodetector with which the coupling means is associated, and a linear gate for connecting the output of the delay circuit to the coordinate computation circuitry when the gate is activated. Decision means are provided which are responsive to the output signal of at least one photodetector for activating the linear gate of a coupling means when a predetermined condition is met within the delay time of the delay circuits of the coupling means.

In one embodiment of the invention, the decision means is a part of each coupling means, and the predetermined condition is met when the energy input to the photodetector associated with the coupling means exceeds a threshold. In another embodiment of the invention, the decision means is responsive to the output signals of all of the photodetectors for specifying the region in the crystal within which a light event occurs, and wherein the descision means includes logic means responsive to the specified region for activating the linear gates only of those coupling means associated with the photodetectors immediately adjacent the light event, and de-activating the other linear gates.

BRIEF DESCRIPTION OF THE DRAWINGS

Embodiments of the invention are disclosed in the accompanying drawings wherein.

DETAILED DESCRIPTION

Figure 1:
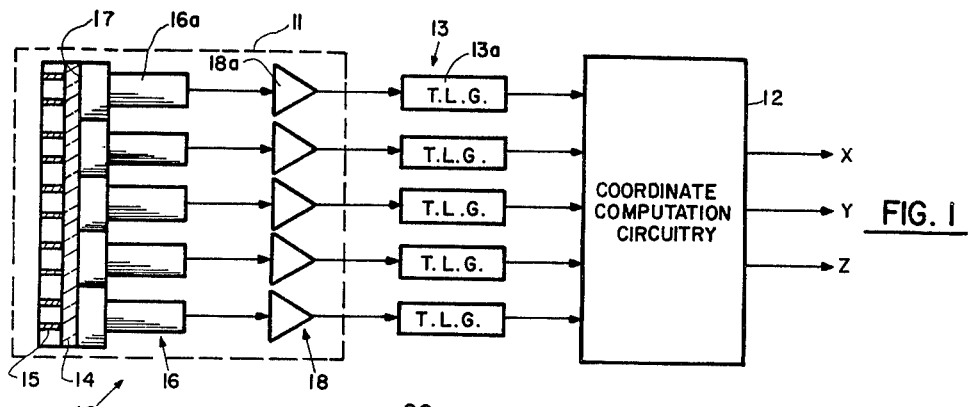
FIG. 1 is a block diagram of one embodiment of the invention.

Referring now to FIG. 1, reference numeral 10 designates radiation imaging apparatus according to the present invention comprising a gamma camera head 11, coordinate computation circuitry 12 and coupling means 13 interposed between camera 11 and circuitry 12. Camera 11 comprises a scintillation crystal 14 responsive to radiation stimuli entering the crystal through collimator 15 for producing light events within the crystal, and a plurality of photomultiplier tubes indicated generally by reference numeral 16. As is well known, it is conventional to utilize nineteen photomultiplier tubes in a gamma camera arranged in a 3-4-5-4-3 configuration. The five photomultipliers shown in FIG. 1 would thus constitute the middle row of the conventional configuration, the remaining photomultipliers of the configuration not being shown in order to simplify the drawing.

Each photomultiplier has a light-sensitive surface 17 facing crystal 14 such that the photomultiplier is responsive to a light event in the crystal for producing an output whose peak value depends on the distance of the light event from the photomultiplier in question. In general, the output signals from each of the photomultipliers of the gamma camera are applied to individual linear amplifiers designated generally by reference numeral 18 for the purpose of raising the signal level to a value compatible with the computation circuitry. When certain photomultiplier tubes (e.g., RCA type 8575 tubes) are used, no preamplification is required.

The coordinate computation circuitry 12 receives the output signals from gamma camera head 11 in accordance with the operation of the coupling means 13 which is described below, and operates on the applied signals for computing the normalized coordinates X' and Y' of the light event as well as the Z signal which represents the total energy of the light event. As is well known, the normalized coordinate signals can be applied to the deflection circuits of a cathode ray tube, while the Z signal may be applied to a single channel analyzer for the purpose of gating on the cathode ray tube beam if the energy is within the single channel setting thereby displaying the light event on the screen of the cathode ray tube.

Circuitry 12 may take the form shown in U.S. Pat. No. 3,011,057. In such case, circuitry 12 includes a matrix of resistors for weighting the outputs of the photomultipliers in accordance with their position in the array, summing amplifiers for providing sum and difference signals, difference amplifiers for combining the sum and difference signals, and ratio circuits for normalizing the computations in terms of the energy of a light event, all as is well known in the art. Reference may be made to U.S. Pat. No. 3,732,417 and, in particular, FIG. 1 which is illustrative of the operation described above.

Alternatively, circuitry 12 may take the form of the circuitry disclosed in copending application Ser. No. 503,767, filed Sept. 6, 1974, which is hereby incorporated by reference. Thus, coupling means 13 can be incorporated in existing radiation imaging systems regardless of the computational techniques involved in computing the coordinates of a light event, and regardless of the type of photomultiplier tubes utilized in the gamma camera.

To facilitate the explanation of the operation of coupling means 13, the operation of a single photomultiplier will be referred to, such photomultiplier being identified as photomultiplier 16a. It should be understood, of course, that the operation of the other photomultipliers is identical to what will be described with respect to photomultiplier 16a.

When a light event occurs anywhere in crystal 14, photomultiplier 16a will have an output signal whose value depends upon the displacement of the light event from this photomultiplier. After the output of the photomultiplier is amplified in preamplifier 18a, if preamplification is necessary, the output signal is applied to a threshold linear gate 13a shown in detail in FIG. 2. Whether the output signal from photomultiplier 16a will be applied to circuitry 12 depends upon whether a predetermined condition of the output signal is met. In the embodiment shown in FIG. 1, the output of photomultiplier 16a will be applied by threshold linear gate 13a to circuitry 12 only if the input to photomultiplier 16a exceeds a predetermined threshold. In other words, if the signal of the light event as seen by photomultiplier 16a is relatively small, as would occur when the light event is remote from this photomultiplier, the input to the photomultiplier will be less than the threshold and threshold linear gate 13a will block the transmission of the output signal from this photomultiplier to the circuitry 12. This will occur for all photomultipliers whose input signal is less than a threshold. This means that only those photomultipliers adjacent the light event will be sufficiently close so that their input signal exceeds the threshold will contribute to the computation carried out by circuitry 12. Thus, the embodiment shown in FIG. 1 will increase the accuracy of computation because it will eliminate those output signals from photomultipliers remote from a light event.

Figure 2:
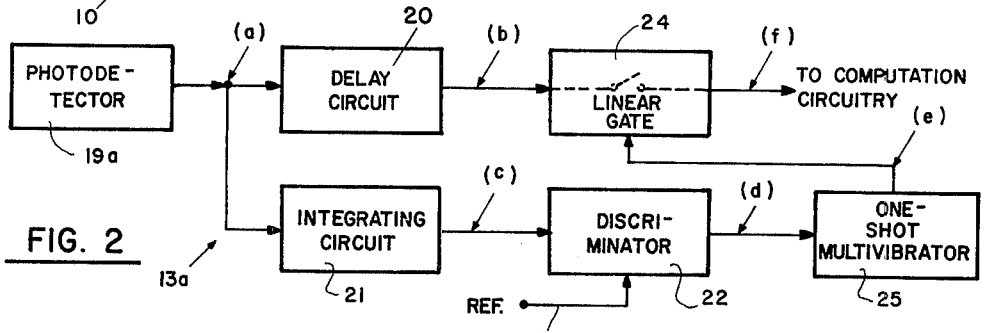
FIG. 2 is a block diagram of a portion of the circuit shown in FIG. 1.

The operation of the threshold linear gates shown in FIG. 1 can be understood by referring to FIG. 2 which shows a single threshold linear gate 13a. In FIG. 2, all of the hardware preceding the threshold linear gate 13a has been designated photodetector means 19a, the latter including photomultiplier 16a and preamplifier 18a if the preamplifier is required.

As shown in FIG. 2, threshold linear gate 13a includes a delay circuit 20 for delaying the output signal of photodetector 19a, an integrating circuit 21 in the form of a pulse shaper for integrating the output signal of the photodetector means 19a to thereby obtain a measure of the energy input to this photodetector means. The time constant associated with integrator 21 is such that a reasonably good measure of the energy in the input to the photodetector means is obtained within the delay time of the delay circuit 20. In addition, the threshold linear gate includes a discriminator 22 responsive to the output of the integrating circuit 21 for producing an enabling signal within the delay time of circuit 20 only if the outut of the integrating circuit exceeds a threshold established by reference 23. Discriminator 22 may be a Fairchild 710.

The threshold linear gate also includes a linear gate 24 connecting the output of delay circuit 20 to the coordinate circuitry 12 when linear gate 24 is activated. Activation of the gate is controlled by the output of one-shot multivibrator 25 which is responsive to an enabling signal produced by discriminator 22. Gate 24 may be in the form of a field effect transistor such as type 2N4416, the output of circuit 25 being applied to the control gate of this transistor. Alternatively, gate 24 may comprise a diode switch or other well known types of switching means.

Figure 3:
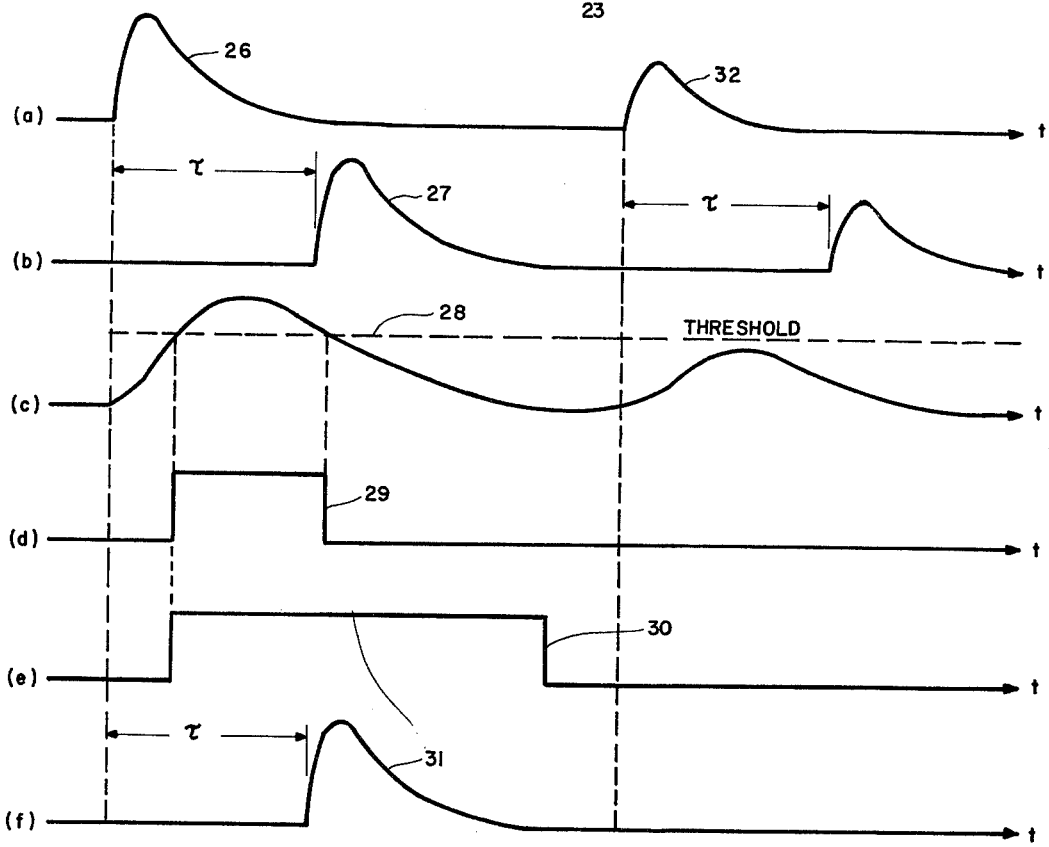
FIGS. 3a–3f are waveforms at various points in the block diagram of FIG. 2.

Referring now to the waveforms of FIG. 3, it can be seen that a light event in the crystal causes photodetector means 19a to produce a pulse indicated by reference numeral 26 of the shape generally indicated in line (a) of FIG. 3. The peak value of this pulse depends upon the distance of the light event from the photodetector that produces pulse 26. Delay circuit 20 has an output indicated in line (b) of FIG. 3 thus producing a pulse practically congruent with pulse 26 but delayed a time τ with respect to this pulse.

The output of integrator 21 is indicated generally by line (c) of FIG. 3 and, as can be seen, in the time period τ, which is the delay time of circuit 20, the output of integrator 21 will exceed the threshold level 28 established by reference 23 of discriminator 22. Consequently, discriminator 22 will produce enabling signal 29 during the time that threshold 28 is exceeded. Enabling signal 29 is applied to multivibrator 25 causing the latter to produce an activating pulse 30 in response to the leading edge of pulse 29. Pulse 30 serves to activate gate 24 allowing delayed pulse 27 which occurs during the existence of the activating pulse 30 to pass through the gate and be applied to circuity 12. Pulse 30 lasts only long enough to permit the passage of all of pulse 27. The pulse passed by linear gate 24 is indicated by reference numeral 31 and is delayed a time τ from the actual pulse 26. The time is of the order of magnitude of 0.5 microseconds.

When a light event is more remote from photodetector 19a, the output signal from the photodetector will be smaller than the pulse 26. This is indicated in line (a) of FIG. 3 by reference numeral 32. As shown in line (c) of FIG. 3, the integration of this pulse will not reach level 28 with the result that discriminator 22 will not produce an enabling pulse and multivibrator 25 will likewise not be triggered into operation. Consequently, gate 24 will remain closed and pulse 32 will not be applied to circuitry 12.

From the above description, it can be seen that coupling means 13a associated with photodetector 12a functions to conditionally apply the output signal of this photodetector to the coordinate computation circuitry. Furthermore, coupling means 13a includes a delay circuit for delaying the output signal of a photodetector, and a linear gate for connecting the output of the delay circuit to the coordinate computation circuitry when the gate is activated. Finally, the pulse shaper, discriminator, and one-shot multivibrator constitute decision means responsive to the output signal for activating the linear gate when a predetermined condition is met within the delay time of the delay circuit. Such predetermined condition is met when the energy input to the photodetector due to a light event exceeds a threshold.

Figure 4:
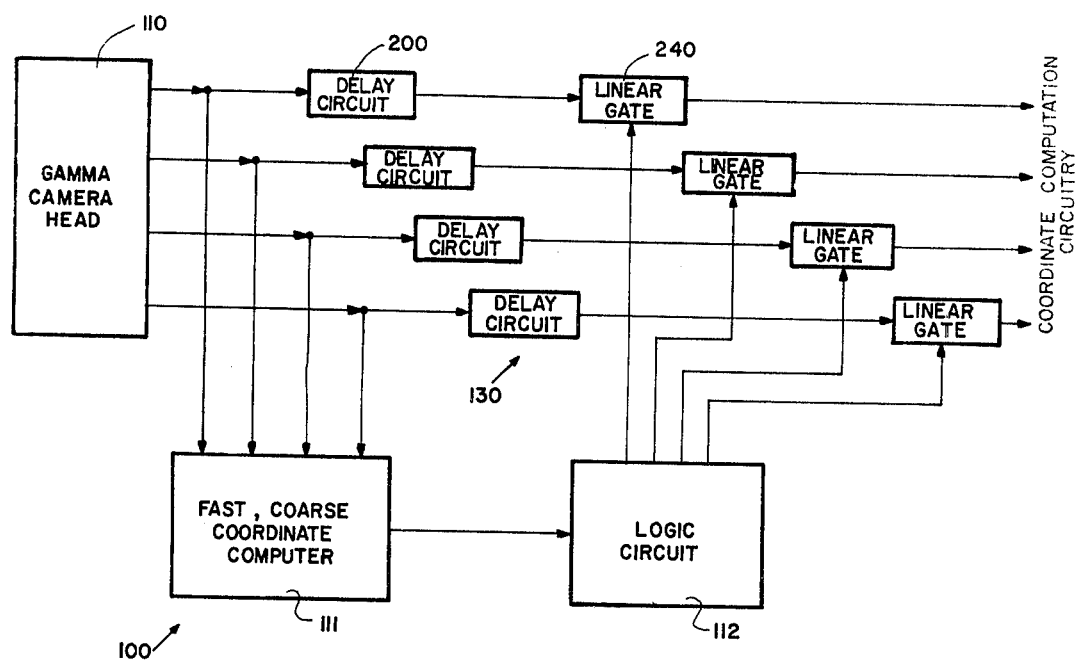
FIG. 4 is a block diagram of a second form of the present invention.

The embodiment of the invention shown in FIG. 4 also involves coupling means associated with each photodetector conditionally applying its output to the coordinate computation circuitry, each coupling means also including a delay circuit and a linear gate. In the embodiment shown in FIG. 4, however, the decision means is also responsive to the output signal of at least one photodetector for enabling the linear gate of one of the coupling means when a predetermined condition is met within the delay time of the delay circuits. In the case of the embodiment of FIG. 4, the decision means is responsive to the output signals of all of the photodetectors rather than a single photodetector as in the case of the embodiment shown in FIG. 1. The decision means in the embodiment of FIG. 4 specifies the region in the crystal within which a light event occurs, and the decision means also includes logic means responsive to the specified region for activating the linear gates only of those coupling means associated with the photodetectors immediately adjacent the light event.

Referring now to FIG. 4, radiation imaging apparatus 100 includes a gamma camera head 110 similar to gamma camera 11 of FIG. 1, and coupling means 130 by which the nineteen output lines from the camera head are connected to the coordinate computation circuitry. In FIG. 4, only four such lines are shown for the purpose of simplifying the drawing. As shown, each output camera head 110 include delay circuit 200 serially arranged with linear gate 240. The outputs of head 110 are applied to computer 111 which operates on the output signals from the head to rapidly compute a rough approximation of the coordinates of the light event, and to obtain a rough measure of the location of the light event. Logic circuit 112 enables signals only from the photodetectors adjacent to the light event coordiantes.

The nature of computer 111 can be similar to that shown in U.S. Pat. No. 3,732,419. Alternatively, computer 111 may merely sum the outputs of groups of adjacent photodetectors for the purpose of determining a sum signal associated with each group. Computer 111 may then compare the sum signals for the purpose of specifying that group having the maximum sum signal whereby the region of the crystal in which the light event occurs is specified by the specified group of photodetectors. Once the region in the crystal containing the light event is specified by computer 111, logic circuit 112 is effective to activate those linear gates 240 associated with the photodetectors immediately adjacent the light event. Since the input to the linear gates is the delayed output signal of head 110, and since computer 111 specifies the region in the crystal within which a light event has occurred within the delay time of delay circuits 200, the output signals of photomultipliers adjacent the light event will be used in circuitry in the coordinate computation circuitry, but the output signals of photomultipliers remote from the light event will not be utilized for computational purposes. It is believed apparent that logic circuit 112 can be arranged to select any predetermined combination of photomultipliers adjacent a light event.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. In radiation imagimg apparatus of the type having a scintillation crystal responsive to radiation stimuli for producing light events, a plurality of photodetectors arranged in a predetermined array relative to the crystal, each of the photodetectors having a lightsensitive surface facing the crystal and being responsive to a light event for producing an output signal, and coordinate computation circuitry for computing the coordinate of a light event from signals applied thereto, the output signals of each photomultiplier being applied to the coordinate computation circuitry via coupling means associated with each photodetector, the improvement comprising:
   (a) a delay circuit in each coupling means for delaying the output signal of the photodetector with which the coupling means is associated;
   (b) a linear gate in each coupling means for connecting the output of the delay circuit to the coordinate computation circuitry when the gate is activated; and
   (c) decision means responsive to the output signal of at least one photodetector for enabling the linear gate of a coupling means when a predetermined condition is met within the delay time of the delay circuits of the coupling means.

2. The invention of claim 1 wherein the decision means is a part of each coupling means, and the predetermined condition is met when the energy input to the photodetector associated with the coupling means exceeds a threshold.

3. The invention of claim 2 wherein the decision means includes an integrating circuit for integrating the output signal of the photodetector to obtain a measure of the energy input thereto within the delay time of the delay circuit, a discriminator responsive to the output of the integrating circuit for producing an enabling signal in the delay time only if the output of the integration circuit exceeds a threshold, and a circuit responsive to the enabling signal from the discriminator for activating the linear gate.

4. The invention of claim 3 wherein the linear gate is a field effect transistor.

5. The invention of claim 1 wherein the decision means is responsive to the output signals of a plurality of the photodetectors for specifying the region in the crystal in which a light event occurs, and wherein the decision means includes logic means responsive to the specified region for activating the linear gates of a preselected group of coupling means associated with the photodetectors immediately adjacent the light event.

6. The invention of claim 5 wherein the decision means computes a rough approximation of the coordinates of a light event within the delay time of the delay circuit, and the logic means is responsive to such rough coordinates for activating selected ones of the linear gates.

7. The invention of claim 5 wherein the photodetectors are arranged in a plurality of groups of adjacent photodetectors, and the decision means includes means for adding the output signals from the photodetectors in each group to form a sum signal associated with each group, and means for comparing the sum signals to specify that group having the maximum sum signal whereby the region of the crystal in which the light event occurs is specified by the specified group of photodetectors.

8. Radiation imaging apparatus comprising:
  (a) a scintillation crystal responsive to radiation stimuli for producing light events;
  (b) a plurality of photodetectors arranged in a predtermined array relative to the crystal, each of the photodetectors being responsive to a light event for producing an output signal;
  (c) coordinate computation circuitry for computing the coordinates of a light event from signals applied thereto; and
  (d) coupling means associated with each photodetector for applying its output signals to the coordinate computation circuitry;
  (e) at least one of the coupling means including a threshold linear gate for applying the output of the photodetector, with which the coupling means is associated, to the coordinate computation circuitry only if the energy input to the photodetector exceeds a predetermined threshold level.

9. Apparatus according to claim 8 wherein the threshold linear gate comprises a delay circuit for delaying the output signal of the photodetector with which the means is associated, an integrating circuit for integrating the output signal of the photodetector to obtain a measure of the energy input thereto within the delay time of the delay circuit, a discriminator responsive to the output of the integrating circuit for producing an enabling signal within the delay time only if the output of the integrating circuit exceeds a threshold, a linear gate for connecting the output of the delay circuit to the coordinate computation circuitry when the gate is activated; and a circuit responsive to the enabling signal for activating the linear gate.

* * * * *